(12) United States Patent
Earle

(10) Patent No.: US 10,228,481 B1
(45) Date of Patent: Mar. 12, 2019

(54) GROUND ELIMINATING METAL DETECTOR

(71) Applicant: White's Electronics, Inc., Sweet Home, OR (US)

(72) Inventor: John L. Earle, Sweet Home, OR (US)

(73) Assignee: White's Electronics, Inc., Sweet Home, OR (US)

( * ) Notice: Subject to any disclaimer, the term of this patent is extended or adjusted under 35 U.S.C. 154(b) by 712 days.

(21) Appl. No.: 14/531,513

(22) Filed: Nov. 3, 2014

(51) Int. Cl.
*G01V 3/10* (2006.01)
*G01V 3/12* (2006.01)
*G01V 3/40* (2006.01)
*G01V 3/15* (2006.01)

(52) U.S. Cl.
CPC .................. *G01V 3/12* (2013.01); *G01V 3/15* (2013.01); *G01V 3/40* (2013.01)

(58) Field of Classification Search
CPC ........ G01R 11/19; G01R 11/40; G01R 29/16; G01R 31/021; G01R 31/023; G01R 31/041; G01R 31/2813; G01R 1/44; G01R 11/18; G01R 11/185; G01R 19/32; G01R 21/14; G01R 33/0082; G07F 17/246; G01J 5/16; G01K 7/10; G01L 19/0092
USPC ............................ 324/67, 225, 239, 326–329
See application file for complete search history.

(56) References Cited

U.S. PATENT DOCUMENTS

| | | |
|---|---|---|
| 3,528,402 A | 9/1970 | Abramowitz |
| 5,414,411 A | 5/1995 | Lahr |
| 5,537,041 A | 7/1996 | Candy |
| 5,576,624 A | 11/1996 | Candy |
| 6,586,938 B1 | 7/2003 | Paltoglou |
| 6,653,838 B2 | 11/2003 | Candy |
| 7,075,304 B2 | 7/2006 | Nelson |
| 8,614,576 B2 | 12/2013 | Candy |
| 8,749,240 B1* | 6/2014 | Foster ...................... G01V 3/10 324/326 |
| 8,629,677 B2 | 7/2014 | Earle |
| 2008/0245628 A1 | 10/2008 | Battlogg |
| 2010/0141247 A1 | 6/2010 | Candy |
| 2010/0148781 A1* | 6/2010 | Candy .................... G01V 3/104 324/329 |
| 2011/0316541 A1* | 12/2011 | Earle ...................... G01V 3/104 324/326 |
| 2012/0146647 A1* | 6/2012 | Candy .................... G01V 3/105 324/329 |

* cited by examiner

*Primary Examiner* — Tung X Nguyen
*Assistant Examiner* — Robert P Alejnikov, Jr.
(74) *Attorney, Agent, or Firm* — James Creighton Wray; Meera P. Narasimhan

(57) ABSTRACT

Remanent ground response is induced by rapid high current in a transmit coil. The transmit coil remains at zero current for a sufficient time for the remanent ground response to be sensed in a receive coil. A rapid high voltage and a sustained low voltage establish and maintain a stable current in the transmit coil followed by a zero current period. The sequence is repeated with a stable negative and followed by positive currents and a zero current. The receive coil is repeatedly interrogated at zero current between switch closings connecting in the transmit coil. Combined ground remanence and target eddy current signals are received during the constant current periods, and the ground remanence signals sensed during zero transmit coil current are subtracted from the combined signals.

4 Claims, 4 Drawing Sheets

GROUND ELIMINATING METAL DETECTOR

SUMMARY OF THE INVENTION

The new invention provides elimination of responses in metal detectors produced by permeability and viscous magnetic remanence from ferrous components in the ground matrix. The permeability component is eliminated during the interrogation period by having a constant low voltage applied to the inducing coil. The remanent component, responding instantly to magnetizing current, but slowly decaying in remanence, is initiated by a fast half sine current that has little effect upon the desired eddy current object energizing time.

The target interrogation period is an extended period, allowing for the settling of the desired target eddy current during the energizing magnetic field that also contains the non linear decaying of the remanent ground component. The remanent ground interrogation is similar, but without the energizing magnetic field persisting throughout the interrogation period. Interrogation times are predetermined throughout the target period and throughout the remanent seeking period, which are stored values that are then subtracted from the target values to leave just the target values.

Remanent ground response is induced by rapid high current in the transmit coil. The transmit coil remains at zero current for a sufficient time for the remanent ground response to be sensed in the receive coil. A rapid high voltage and a sustained low voltage establish and maintain a stable current in the transmit coil followed by a zero current period. The sequence is repeated with a stable positive current and a zero current. The receive coil is repeatedly interrogated between switch closings between the capacitor and the transmit coil. Ground combined remanence and target eddy current signals are received during the constant current periods and the ground remanence signals sensed during zero transmit coil current flow are subtracted from the combined signals.

A capacitor is charged with a positive high voltage source. A first switch is closed, discharging the capacitor charge into a transmit coil. The capacitor is partially charged with current returning from the transmit coil. For a predetermined time delay a zero current is maintained in the transmit coil. Topping off the negative charge in the capacitor occurs during the delay. The negative charge is discharged from the capacitor to the transmit coil, and a negative low voltage source maintains a negative current in the transmit coil for a predetermined time.

The first switch is closed, providing a positive charge to the capacitor with current flowing from the coil. For a predetermined time zero current flow is in the transmit coil. The positive charge is topped off in the capacitor during the zero current flow time. The positive charge from the capacitor is discharged into the transmit coil, and a positive current in the transmit coil is maintained with the positive low voltages source for a predetermined time. Closing the first switch, a negative charge is provided to the capacitor with current flowing from the transmit coil to the capacitor. For a predetermined time delay zero current flow is in the transmit coil.

Topping off the negative charge in the capacitor occurs during the delay. The process continues cyclically repeating the sequences.

Interrogating for signals of ground remanence occurs during the periods of zero current flow in the transmit coil. Interrogating for combined signals of ground remanence and signals of target eddy currents occurs during maintaining the current. Ground remanence signals obtained during zero current are stored and subtracted from the combined signals.

The disclosures of U.S. patent application Ser. Nos. 13/235,916 and 14/060,200, now U.S. Pat. Nos. 8,878,515 and 9,285,496, are incorporated herein by reference as if fully set forth herein.

These and further and other objects and features of the invention are apparent in the disclosure, which includes the above and ongoing written specification, with the claims and the drawings.

DETAILED DESCRIPTION

Figure 1:
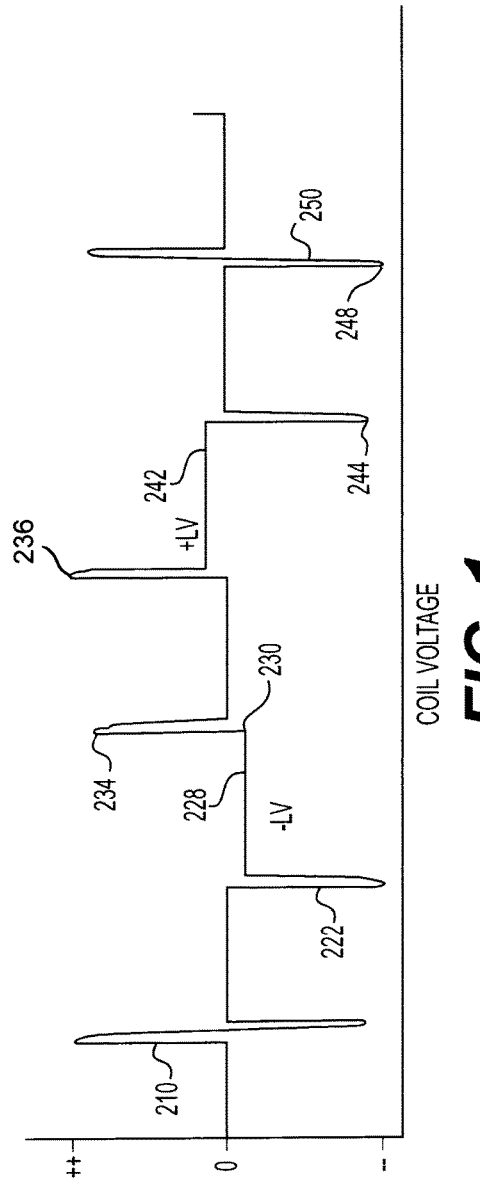
FIG. 1 shows the relatively high coil voltage that is applied to the coil by a charged capacitor.
Figure 2:
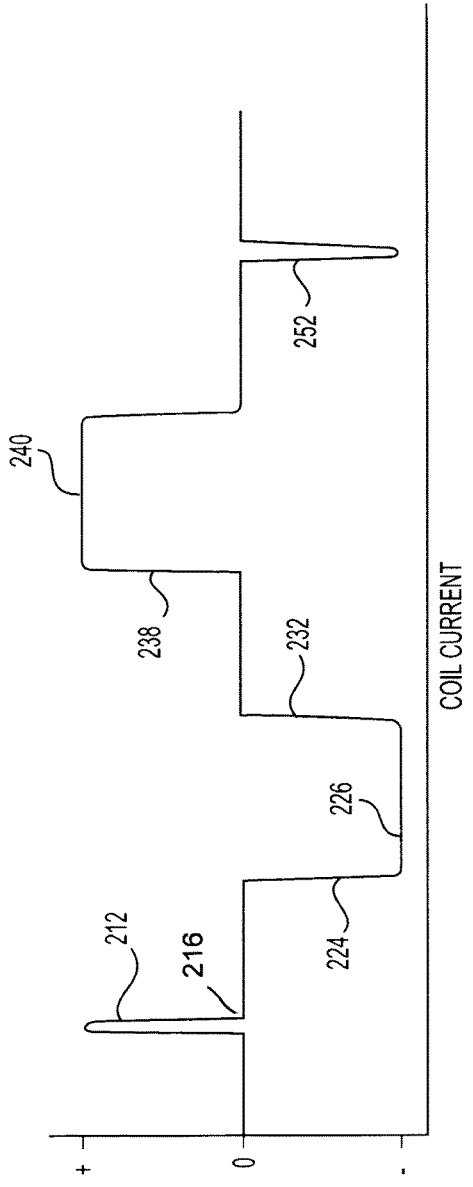
FIG. 2 shows the current waveforms, correlated to the voltage waveforms.

FIGS. 1 and 2 show voltages applied to and the currents in the transmit coil. The relatively high coil voltage 210 is applied to the transmit coil by a charged capacitor. That starts a portion 212 of a sine wave of current that ends when the current returns to zero 216 for the remanent ground excitation. The remanent ground excitation occurs in less than 10 microseconds, which is sufficient to magnetize the remanent ground mineralization, but is inadequate to get the much longer eddy current target currents excited that are typically from 10 to 100 microseconds for adequate excitation of the eddy current responses. Later, for the target excitation, the same high voltage 222 charged capacitor is applied to the excitation coil, but when the current 224 gets to a maximum 226, near returning to zero volts, a low voltage DC 228 is applied to sustain the current developed by the capacitor current in ¼ of the resonant cycle with the inductor. At the end of the low voltage DC period, the low voltage DC is terminated causing the coil to send current 232 back which is captured in the capacitor as voltage 234 for the next excitation period. The voltage is topped off 236 during a period of zero voltage on and zero current in the transmit coil for the next cycle. When the voltage 236 is applied to the coil and the current 238 reaches a maximum 240, a low voltage 242 is applied to the coil to maintain the maximum current 240. When the low voltage 242 is switched off, the current is fed back into the capacitor and stored as voltage 244. The capacitor is toppled off to voltage 248. The topped off voltage 248 from the capacitor is applied 258 to the coil to cause a current spike 252 for remanent ground excitation, and the entire cycle is repeated.

FIG. 2 shows the current waveforms 212, 226, 240, 252, correlated to the voltage waveforms 210, 222, 228, 234, 236, 242, 244, 248, 520 shown in FIG. 1. The permeability ground component is not affected during the longer low voltage 228, 242 and current flow periods 226, 240.

Interrogation of the long target period is performed at one or more convenient points after the capacitor current transients are over, leaving the target object eddy current charging burden upon the output wave from a second coil in the search coil system as in a typical induction balance, air core search coil system.

The system also can be configured to interrogate after the energizing periods of the magnetic field, wherein the target object eddy currents continue for a while as in a traditional pulse detector. Either or both interrogation periods can be used, since both have no permeability ground component, but both have the remanent ground, and the longer one has that and the eddy current target object.

The stored remanent voltage values for all the selected interrogation points are subtracted from the target values to reveal just the desired eddy current target object. The remanent ground component is not affected by time, but it is determined by the current peak, which is the same as the longer target current excitation.

All signals are bipolar. When summed, the bipolar signals eliminate the DC offset that would otherwise be evident when the search coil is being moved through the Earth's magnetic field.

In traditional induction balance detectors, sine waves are used and interrogation sampling is only done when there is no current change, or at the current peaks.

For quadrature phase analysis, sampling data at other places contains a permeability ground induced error and an error from the remanent ground as well. These are nulled out for the zero change current interrogation, and the other sample is low frequency filtered to negate the ground induced signal. This invention separates the two ground components because of the difference between target and remanent ground excitation and decay characteristics so that no nulling, automatic or manual, is needed during searching for target objects.

Figure 3:
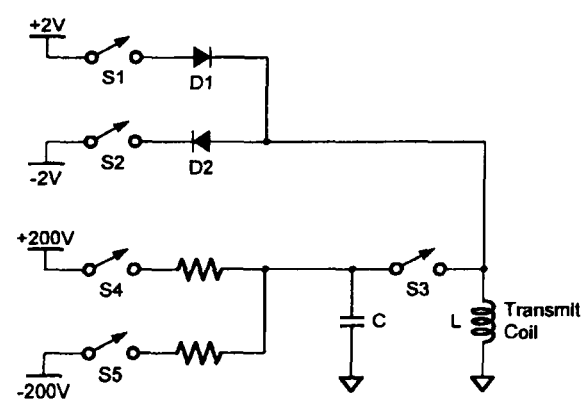
FIG. 3 is a schematic circuit diagram showing the voltage sources, resistors, diodes, capacitor and transmit coil as used in the invention.

The hardware and circuitry of the present invention is identical to that of the previous constant current application Ser. No. 13/235,916, now U.S. Pat. No. 8,878,515. The difference is in the logic timing of when the various switches are operated. In the previous current version, the high voltage switches were always affiliated with the low voltage switches, whereas in this new application there are times when only the high voltage, half sine is used alone. FIG. 3 shows switching timing.

In the present invention, half sine or ¼ sine current peak establishes magnetization of the viscous magnetic ground mineral component, alternately followed by either an end of the magnetization current or sustaining the same current through application of a low voltage DC keeping the peak current flowing. The short half sine derived remanent signal can be subtracted from the longer target signal, leaving only the target response.

A high voltage charged capacitor is used to resonate through ½ sine of current for a short time period, less than that of the desired eddy current target object charging time. The same capacitor resonates through ¼ of a sine of current that is sustained by a low voltage DC that is longer than the eddy current target energization time.

Samples following the long and short magnetizing periods, with the short remanence data being subtracted from the long target data, reveal the characterization of just the eddy current target object.

Using bipolar excitation eliminates Earth magnetic field offsets.

Using equal currents of long and short duration to alternately energize the target and the viscous magnetic remanent ground component and subtraction of the viscous magnetic remanent ground component reveals the target without the need to have low frequency "motion" filtering to characterize the target. Target data is determined by several points in time domain, as opposed to several frequencies needed in frequency domain with composite ground elimination phase needed for each frequency, since both ground components are combined in the frequency domain method.

A high voltage capacitor and low voltage sources are connected in precise sequences with solid state switches to a transmitting coil in a metal detector. During operation the capacitor is charged positive or negative. The capacitor is fed with breakdown voltage from the coil. Then the capacitor is topped off with added voltage.

The positively charged capacitor is discharged into the coil causing a positive voltage spike in the coil, and causing a positive coil current spike. The coil voltage and the coil current return to zero and remain at zero for a predetermined period. During that period of zero voltage and zero current flow the capacitor is charged negatively.

The capacitor is discharged into the coil causing a negative current in the coil. Before the current reaches zero, a low voltage source is applied to the coil, maintaining a low constant negative current in the coil for a second period. When that second period is stopped by discontinuing, the low negative voltage applies a positive voltage in the coil spikes, and the coil discharges into the capacitor, partially positively charging the capacitor.

The coil then remains at zero voltage, zero current flow for a third period. During that third period of zero transmit coil voltage and current, the capacitor is topped off positively.

Following the third period, the positively charged capacitor is discharged into the coil, causing a slightly higher positive voltage in the coil. Before that positive voltage returns to zero, a positive low current source is applied to the coil over a fourth period. When that positive low current source is discontinued, the coil current drops and the resultant negative spike of coil voltage partially negatively charges the capacitor. The voltage applied to the coil and the coil current remains at zero for a fifth period while the capacitor is topped off.

The sequence repeats the steps of—no voltage no current, the same as the first period, a negative discharge and low negative current maintaining, turning off the negative current source causing a positive voltage spike partially positively charging the capacitor, holding the coil at zero voltage and current while topping off the capacitor, and so forth.

FIG. 3 depicts the block diagram schematic. Switches S1, S2, S3, S4 and S5 shown are semiconductors, such as transistors, FET's, etc. programmed as shown in FIGS. 4 and 5.

Figure 4:
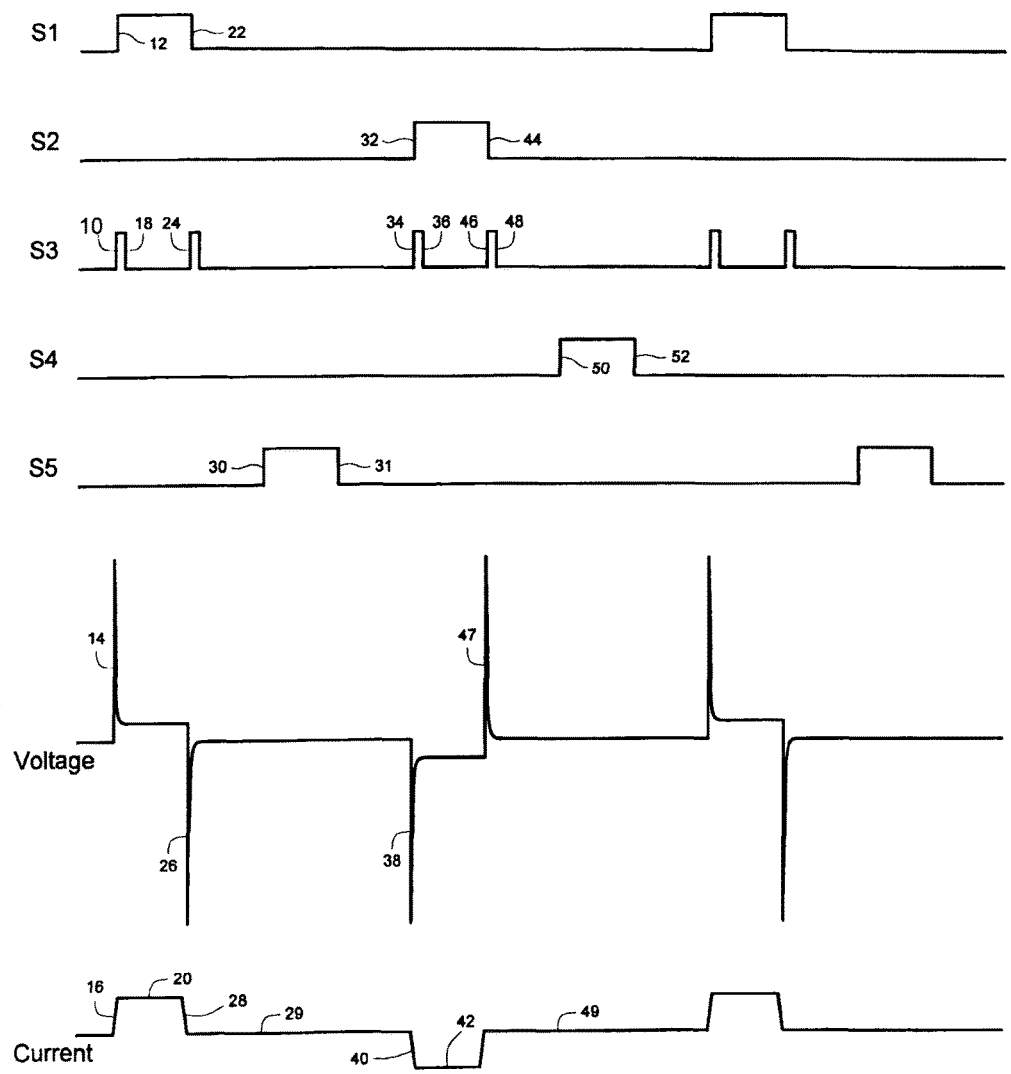
FIG. 4 is a schematic representation of timing of the switches to provide the voltages and coil current of this invention.
Figure 5:
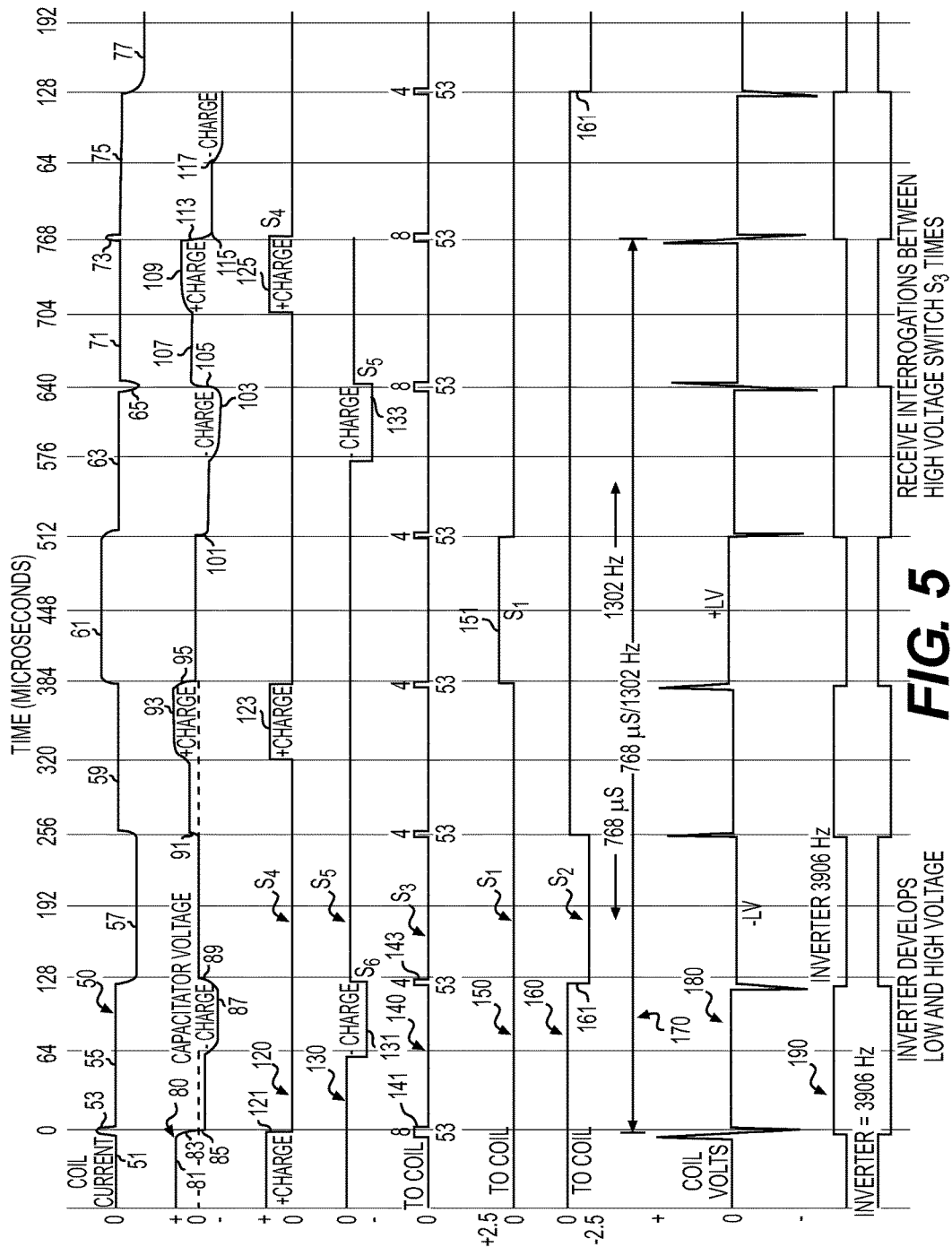
FIG. 5 is a series of graphs showing transmit coil timing.

FIG. 4 illustrates the timing sequence, with positive direction indicating the on time of each switch, as described in the constant current application.

As shown in FIGS. 3 and 4, the following steps occur. The process starts with switch S4 turning on to charge capacitor C with a high voltage (+200 volts). Switch S4 is turned off.

Next, switch S3 turns on for about 4 microseconds, connecting capacitor C (0.01 Mfd) to the coil L of 0.53 Mhy. During this time, energy is transferred from the capacitor C to the coil L in a classic inductance/capacitance resonance with frequency of ½pi, square root of LC, where L is in henries and C is in farads. For this example, f=69,000 Hz (69 Khz.) This frequency, if allowed to continue resonating, would have a period of 14.4 microseconds. But, maximum current is obtained within only ¼ of a complete cycle, giving a period of only 3.6 microseconds. When current becomes maximum, the voltage of the resonant system approaches zero, but is caught by diode D1, that sustains the current at a constant level from being turned on by switch S1 at the same time switch S3 turned on and switch S3 turns off. Thus, the desired current is achieved in less than 4 microseconds.

The desired eddy current targets typically have a charge and discharge time constant of 10 to 100 microseconds, so they are largely unaffected by this fast pulse that establishes the constant energizing field current. Once established, diode D1 sustains the coil charging current for 125 microseconds, which is long enough to energize the eddy current object. Because the current is essentially constant during this time of 3 to 125 microseconds, there is no di/dt or rate of current change that would create a signal from the ground mineralization permeability.

This is helpful in giving that same entire period of observing for eddy current target charging distortion to the constant current from 3 to 125 microseconds, producing a target signal with no permeability signal present, similar to the standard pulse decay time target response, but of opposite polarity. And additionally, because of the wide difference between magnetic remanence charging time and discharge time, there is a difference between this active but constant signal and the zero current, after the pulse traditional pulse signal, producing better characterization of the target and the magnetic remanent portion of the ground mineralization.

At the end of the 125 microsecond constant current, diode D1 current is cut off by switch S1 opening, and switch S3 closes at the same time. The coil current collapses without current through diode D1, and a large back emf charges capacitor C in the negative direction, almost reaching a negative 200 volts, and switch S3 opens leaving capacitor C nearly charged, but of opposite polarity to when it started with +200 volts through switch S4.

For the next cycle, switch S5 closes to fully charge capacitor C in the negative direction to −200 volts. Switch S5 turns off followed by switch S3 closing again and switch S2 closing the coil/capacitor resonance occur again, with the opposite polarity to induce the negative current period. Switch S3 opens as the desired negative current is achieved. Switch S2 remains closed with diode D2 maintaining the negative constant current through the 125 microsecond period.

At the end of the second 125 microsecond period, switch S2 opens and switch S3 closes and a large back emf charges capacitor C in the positive direction, almost reaching a positive 200 volts, and switch S3 opens leaving C nearly charged, to when it started with +200 volts through switch S4. Switch S4 closes briefly to fully charge capacitor C and the cycle repeats.

Thus, there is a bipolar field established, which is helpful in negating the earth's magnetic field and other noise sources. Most of the back emf is used to recharge capacitor C, making it an efficient system with little energy lost in dissipation as in a traditional pulse detector that dissipates energy through the zener breakdown of the switching device.

FIG. 4 is a schematic representation of timing of the switches to provide the voltages and coil current of the constant current invention. The on times of closing of switches S1-S5 and the coil voltage and coil current in transmit coil L are shown.

Initially capacitor C is charged. When switch S3 is closed 10 and switch S1 is closed 12, voltage in coil L rapidly increases 14 and coil current rises 16.

When switch S3 is opened 18, constant coil current 20 is maintained from the +2 v source, through switch S1 and its diode D1, shown in FIG. 1.

When switch S1 is opened 22 and switch S3 is closed 24, voltage 26 in the coil is negative, and back emf flows through switch S3 into the capacitor C. The coil current rapidly drops 28 to zero for a period of rest 29. Switch S5 is closed 30 to top off the capacitor C with a full negative voltage charge from the −200 v source. Then switch S5 is opened 31. At the end of the period of rest 29, switch S2 is closed 32 and switch S3 is briefly closed 34 and opened 36. Negative voltage energy from capacitor C is conducted to the coil L, which creates a negative voltage 38 and causes negative current to increase 40 in coil L. The negative current is maintained constant 42 from the −2 v source through switch S2 and diode D2.

Switch S2 is opened 44 and switch S3 is closed 46 and coil voltage 47 is discharged from the coil L through switch S3 to the capacitor C, charging the capacitor with positive voltage 47 from coil L. Switch S3 is opened 48, holding the charge on the capacitor. Switch S4 is closed 50 connecting the capacitor to the +200 v positive voltage source to fully charge the capacitor, whereupon S4 is opened 52.

The cycle repeats as shown with important constant positive current 20 in the coil L for 125 microseconds, followed by a zero current rest time 29 of about 375 microseconds, followed by a constant negative current 40 in the coil, followed by a rest time 49 of zero current in the coil.

Referring to FIG. 5, the coil current is represented on line 50. Zero current 51 is followed by a positive current spike 53, followed by zero current 55, followed by a negative current 57 and a zero current 59. A positive constant current 61 is followed by zero current, followed by a negative spike 65, a zero current 71, a positive spike 73 and a zero current 71, followed by a constant low current 77. Sequence 71, 73, 75 and 77 repeats sequence 51, 53, 55 and 57 and the entire sequences continuously repeat. The numbers along the top represent microseconds.

Line 80 shows capacitance in the capacitor which is initially positively charged 81 then discharged 83. The capacitor is charged negatively 85 by current from the coil and is topped off 87. Discharging 89 the negatively charged coil provides the negative voltage in the coil and the negative current in the coil, which is maintained by the low voltage negative source. When the negative low voltage source is switched off, the coil is connected to the capacitor, and the reverse current flow positively charges 91 the capacitor, which is topped off 93 by the high voltage source. The capacitor is connected to the coil to discharge into the coil and provide the initiation of the current which is maintained by the low voltage positive current source. When the low voltage positive current source is switched off, the coil is connected to the capacitor to negatively charge 101 the capacitor with the discharge of the coil. The capacitor is topped off 103 with the negative high voltage source.

The capacitor is discharged 105 into the coil to cause the negative current spike pulse 65 which decays to deliver the positive charge 107 to the capacitor. The capacitor is topped off 109 by the positive high voltage source. When the capacitor delivers 113 a positive current spike 73 to the coil, the coil current decays into the capacitor, negatively charging 115 the capacitor. The negative charge is topped off 117 by the negative high voltage source similar to the topping off 87 and the cycle sequence continuously repeats.

Line 120 represents the positive high voltage source charging 121, 123, 125 and topping off the capacitor by the operation of switch S4.

Line 130 represents the positive high voltage source charging 131, 133 and topping off the capacitor by the operation of switch S5.

Line 140 represents the timing of the closing of switch S3 to connect the capacitor to the transmit coil. The relatively wide (long) switch closings 141 allow a full half sine wave of voltage for providing a current pulse from the capacitor to the coil and providing a flow of current to recharge the capacitor in an opposite polarity. The relatively narrow (short) switch S3 closings 143 allow discharge of the capacitor into the coil or flow of current from the coil to the capacitor to partially recharge the capacitor.

Line 150 shows operations of switch S1 which closes 151 to provide a constant positive low current in the transmit coil from a low positive voltage source.

Line 160 shows operations of switch S2 which closes 161 to provide a constant negative low current in the transmit coil from a low negative voltage source.

Line 170 represents one cycle of sequences in the repeating cycles.

Line 180 represents voltage in the coil. A full sine wave 181 of voltage results from closing switch S3 to provide a positive voltage from the capacitor to the coil and leaving switch S3 closed to allow return of voltage from the coil to the capacitor.

An inverter is used to develop low and high voltages 190.

Receive coil interrogations take place between the high voltage switch S3 closing times.

The new invention provides elimination of responses in metal detectors produced by permeability and viscous magnetic remanence from ferrous components in the ground matrix. The permeability component is eliminated during the interrogation period by having a constant low voltage applied to the inducing coil. The remanent component, responding instantly to magnetizing current, but slowly decaying in remanence. is initiated by a fast half sine current that has little effect upon the desired eddy current object energizing time.

The target interrogation period is an extended period, allowing for the settling of the desired target eddy current during the energizing magnetic field that also contains the non linear decaying of the remanent ground component. The remanent ground interrogation is similar, but without the energizing magnetic field persisting throughout the interrogation period. Interrogation times are predetermined throughout the target period and throughout the remanent seeking period, which are stored values that are then subtracted from the target values to leave just the target values.

While the invention has been described with reference to specific embodiments, modifications and variations of the invention may be constructed without departing from the scope of the invention, which is defined in the following claims.

I claim:

1. A method comprising: detecting buried target objects with a detector by performing steps of:
   providing first and second high voltage sources of opposite polarity in the detector,
   providing first and second low voltage sources of opposite polarity in the detector,
   providing a capacitor in the detector,
   providing a transmit coil in the detector, providing a receive coil in the detector,
   connecting the capacitor in parallel to the first and second high voltage sources and to the first and second low voltage sources,
   connecting the transmit coil to the capacitor, the first and second high voltage sources and the first and second low voltage sources, and
   further comprising performing the following sequence of steps:
   charging the capacitor with the first high voltage source,
   then discharging the capacitor through the transmit coil,
   then charging the capacitor from the transmit coil until there is no longer current flowing through the transmit coil,
   then further charging the capacitor with the second high voltage source during the maintaining of zero current flow in the transmit coil,
   then discharging the capacitor into the transmit coil,
   then discharging from the transmit coil towards a ground formation containing the buried target objects and inducing a response comprising ground remanence signals and eddy current signals,
   then detecting the ground remanence signals and the eddy current signals with the receive coil,
   then coupling the second low voltage source to the transmit coil,
   then maintaining a constant current flow in the transmit coil with the second low voltage source,
   then decoupling the second low voltage source from the transmit coil,
   then coupling the capacitor to the transmit coil,
   then charging the capacitor with current from the transmit coil until there is no longer current flow through the transmit coil,
   then further charging the capacitor from the first high voltage source while maintaining zero current flow in the transmit coil,
   then discharging the capacitor into the transmit coil,
   then coupling the first low voltage source to the transmit coil, decoupling the capacitor from the transmit coil, and maintaining a low current in the transmit coil,
   then decoupling the first low voltage source from the transmit coil,
   then coupling the capacitor to the transmit coil,
   then charging the capacitor with current from the transmit coil until there is no longer current flow through the transmit coil,
   then detecting the ground remanence signals with the receive coil during the zero current flow period in the transmit coil,
   then coupling the second high voltage source to the capacitor,
   then further charging the capacitor during the maintaining of zero current flow in the capacitor, and
   then subtracting ground remanence signals from the combined ground remanence signals and the eddy current signals to yield the eddy current of the buried target objects, and
   then detecting the buried target objects using the eddy current of the buried target objects.

2. The method of claim 1, further comprising after subtracting the ground remanence signals from the combined ground remanence signals but before detecting the buried target objects:
   coupling the capacitor to the transmit coil,
   discharging the capacitor to the transmit coil,
   partially charging the capacitor with current from the transmit coil,
   maintaining current flow at zero in the transmit coil, and
   increasing the charge of the capacitor with the first high voltage source while maintaining current flow at zero in the transmit coil.

3. The method of claim 1, further comprising interrogating for signals received in the receive coil and detecting change of a magnetic field in the receive coil for remanence signals and for eddy current signals from the target objects during the maintaining zero current flow steps.

4. The method of claim 3, further comprising interrogating for signals received in the receive coil and detecting remanence signals during the maintaining zero current flow in the transmit coils, storing the remanence signals, interrogating for and detecting combined target eddy current signals and remanence signals received in the receive coil during the maintaining of constant current flow in the transmit coil, and subtracting the stored remanence signals from the combined signals and detecting resultant target eddy current signals.

\* \* \* \* \*